United States Patent [19]

Houle

[11] 4,381,884

[45] May 3, 1983

[54] ADJUSTABLE HOLDER FOR AN OPTICAL ELEMENT

[75] Inventor: Omer Houle, Orlando, Fla.

[73] Assignee: The United States of America as represented by the Secretary of the Air Force, Washington, D.C.

[21] Appl. No.: 267,938

[22] Filed: May 28, 1981

[51] Int. Cl.³ .............................................. G02B 7/18
[52] U.S. Cl. ...................................... 350/287; 350/321
[58] Field of Search ............... 350/287, 286, 288, 321, 350/320; 372/107; 248/481

[56] References Cited

U.S. PATENT DOCUMENTS

| | | | |
|---|---|---|---|
| 1,744,994 | 1/1930 | Von Hofe et al. | 350/539 |
| 2,997,912 | 8/1961 | Mikic | 350/250 |
| 3,194,108 | 7/1965 | Gunther | 350/286 |
| 3,473,865 | 10/1969 | Crosswhite | 350/168 |
| 3,515,464 | 6/1970 | Peifer et al. | 350/286 |
| 3,588,025 | 1/1971 | Gersman | 350/288 |
| 4,165,921 | 8/1979 | Kirsch | 350/288 |

FOREIGN PATENT DOCUMENTS

| | | | |
|---|---|---|---|
| 2363765 | 6/1975 | Fed. Rep. of Germany | 350/288 |
| 55-93114 | 7/1980 | Japan | 350/288 |
| 440753 | 1/1968 | Switzerland | 350/287 |
| 611166 | 6/1978 | U.S.S.R. | 350/288 |
| 771598 | 10/1980 | U.S.S.R. | 350/288 |

*Primary Examiner*—Jon W. Henry
*Attorney, Agent, or Firm*—Donald J. Singer; John R. Flanagan

[57] ABSTRACT

An adjustable holder has a base, a cover and a sphere-like element for supporting a prism or other optical element within a central cavity formed in the base. The base and cover have interior spherical surface portions which are engaged by exterior spherical surface portions on the prism-supporting element so as to allow universal movement of the prism relative to the base for readjusting the angular position of the prism relative thereto in roll, pitch and yaw simultaneously. The cover may be tightened onto the base for clamping the sphere-like element therebetween and holding the prism in the desired adjusted position.

6 Claims, 7 Drawing Figures

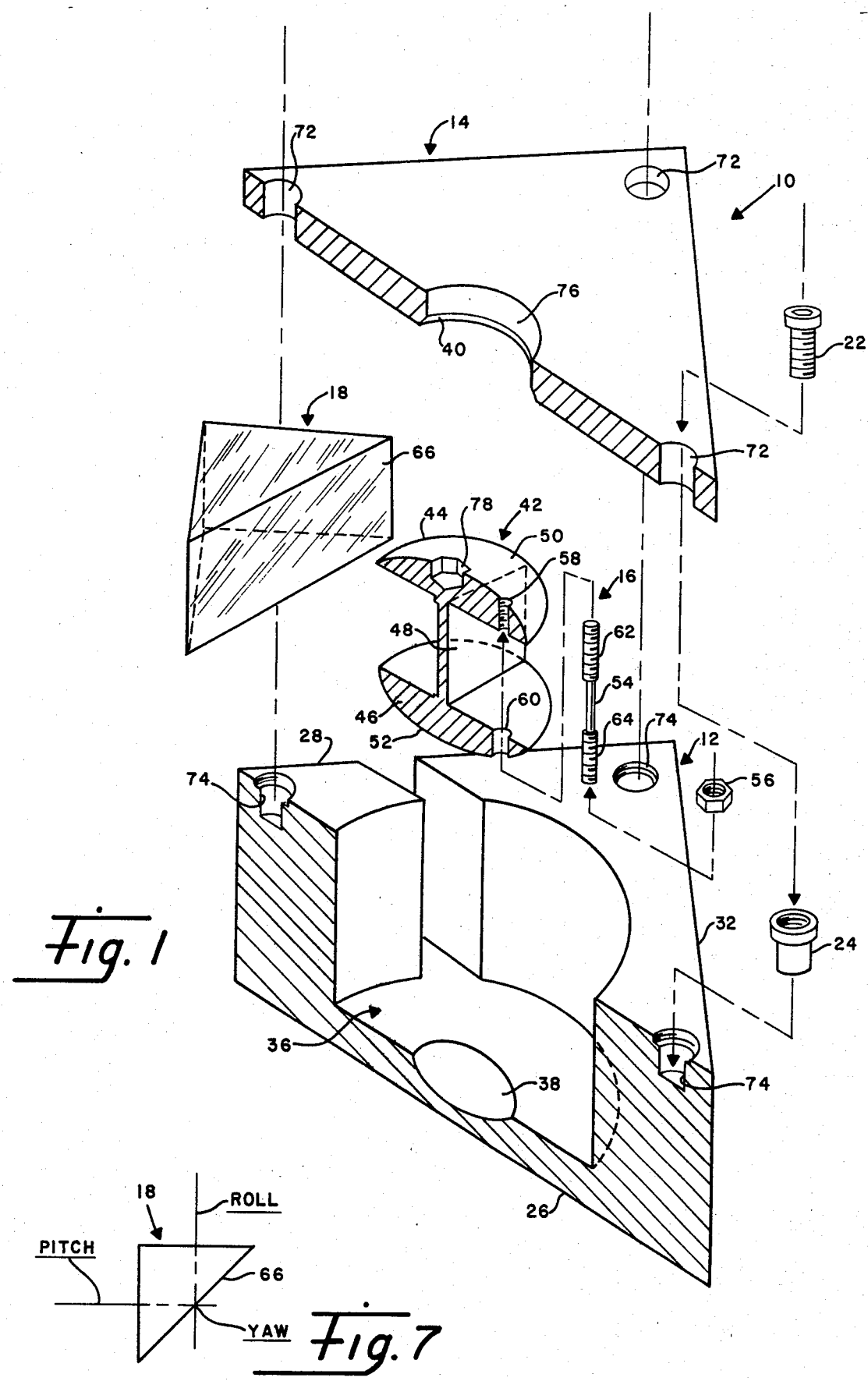

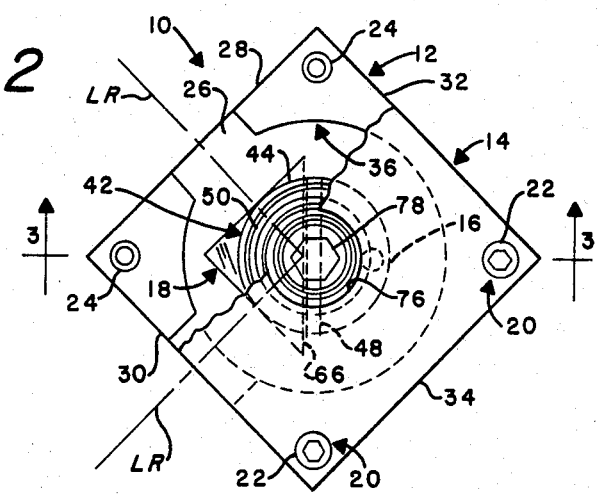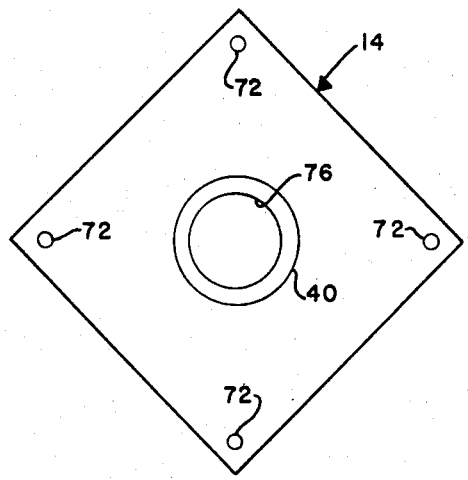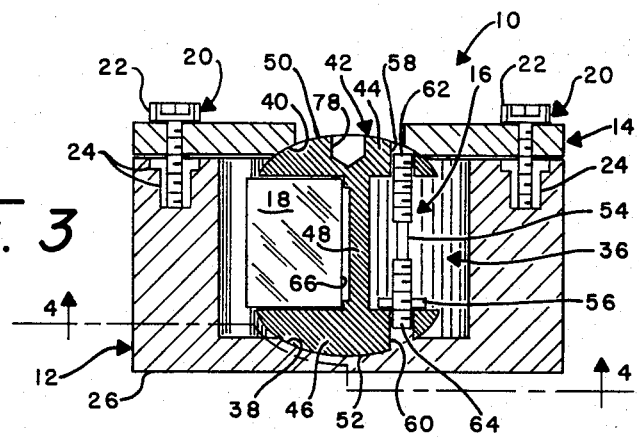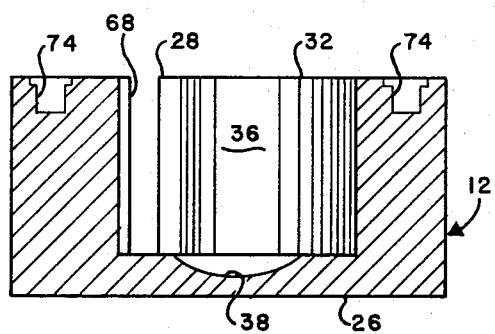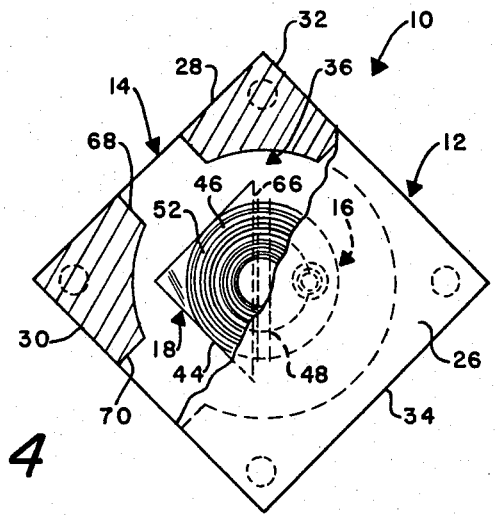

ADJUSTABLE HOLDER FOR AN OPTICAL ELEMENT

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to the mounting, and adjustment of the position, of an optical element, such as a prism, and, more particularly, is concerned with an adjustable holder for allowing universal adjustment of the angular position of the prism, that is, in roll, pitch and yaw, simultaneously.

2. Description of the Prior Art

The patent to von Hofe et al, U.S. Pat. No. 1,744,994; Mikic, U.S. Pat. No. 2,997,912; Gunther, U.S. Pat. No. 3,194,108; Crosswhite, U.S. Pat. No. 3,473,865; and Peifer et al, U.S. Pat. No. 3,515,464, relate to various instruments and devices which utilize one or more optical elements, such as prisms. Most of the prisms are adjustable only about one rotational axis. None of the instruments have a prism mounting arrangement which allows adjustment of the prism about three mutually perpendicular axes.

Arrangements which accommodate adjustment of the optical element about more than one axis commonly utilize a number of adjustable screws which together hold the element in the desired angular position. However, to readjust or correct the position of the optical element for whatever reason, a tedious, time-consuming procedure of individually and repetitively adjusting each screw must be undertaken. Unfortunately each time an angular correction is made in one direction, the alignment in another direction is adversely affected. As a result, each screw has to be adjusted and readjusted an unpredictable number of times. The inordinate length of time that ordinarily has to be spent in adjusting the position of the element wears on the operator's patience and sometimes contributes to the adjustments being made with less than the required precision. Therefore, a need exists for an adjustable mechanism or device which would facilitate accurate readjustment or correction of the position of the optical element in a reasonably short and predictable length of time.

SUMMARY OF THE INVENTION

The present invention obviates the above-described problems of prior art arrangements by providing an adjustable holder which allows adjustment of the position of the optical element in all angular directions at one time. In effect, the series of adjustment steps which had to be made in succession heretofore can now be made simultaneously with a proportinate savings in the time consumed in carrying out the adjustments. Also, achievement of greater accuracy in the performance of the adjustments may be reasonably expected through use of the holder of the present invention. Furthermore, the adjustable element which supports the optical element occupies less space than many prior art devices. Universal movement of the optical element about multiple axes concurrently is provided in the adjustable holder of the present invention through the establishment of engagement between those of its parts which move relative to one another at portions of a common spherical surface defined on the parts. Not only does relative movement at engaging portions of the spherical surface promote easier and quicker correction or readjustment of the position of the optical element, but it also allows for a more desirable distribution of the clamping forces used to retain the element in the correct position.

Accordingly, the present invention provides an adjustable holder for an optical element, such as a prism or the like, which comprises: (a) a base having a portion defining a first spherical surface; (b) a cover mountable to the base and having a portion defining a second spherical surface spaced from, but facing, the first spherical surface when the cover is mounted to the base; (c) means for supporting the optical element between the base and cover; and (d) means for attaching the cover to the base. The supporting means is capable of being disposed between the base and cover and has spherical surface portions at its opposite ends. The first and second spherical surface portions of the base and cover and the opposite end spherical portions of the supporting means are all part of a common spherical surface. Therefore, universal movement of the supporting means relative to the base and cover may take place when the supporting means is disposed between the base and cover, since the spherical surface portions of the base and cover engage the opposite end spherical surface portions of the supporting means along this common spherical surface. The attaching means fastens the cover to the base so as to apply forces through the first and second spherical surface portions of the base and cover and against the opposite end spherical surface portions of the supporting means for clamping the same in a fixed angular position relative to the base. Further, the attaching means is adjustable for varying the magnitude of the forces so applied against the supporting means to allow the supporting means to be universally moved relative to the base to readjust the angular position of the supporting means and optical element therewith relative to the base in roll, pitch and yaw simultaneously.

More particularly, the supporting means includes a pair of spaced apart spherical segments defining the respective end spherical surface portions, a central membrane web interconnecting the spherical segments with the optical element being supported at one side of the web between the spherical segments, and adjusting means disposed between the spherical segments at a side of the web opposite to its one side for causing the spherical segment to securely clamp the optical element therebetween and in fixed relationship to the segments and interconnecting web. At least the base or cover has an opening defined therein for providing access to the supporting means to facilitate moving the supporting means to readjust its angular position and that of the optical element relative to the base. The base also includes a plurality of windows through which light rays may be transmitted to and from the optical element. A recess configured to accept a tool for use in universally moving the supporting means, to readjust the angular position of the optical element and path of the light rays through the base windows, is defined in the supporting means and aligned with the opening in the base or cover.

BRIEF DESCRIPTION OF THE DRAWINGS

FIG. 1 is a perspective sectional view, in exploded form, of the adjustable holder of the present invention, showing only one-half of the base and cover and of the sphere-like element for supporting the prism.

FIG. 2 is a top plan view of the adjustable holder with the prism and sphere-like supporting element disposed between the base and cover of the holder.

FIG. 3 is a cross-sectional view taken along line 3—3 of FIG. 2.

FIG. 4 is a bottom plan view, partly in section, as seen along line 4—4 of FIG. 3.

FIG. 5 is a bottom plan view of the cover of the adjustable holder.

FIG. 6 is a cross-sectional view of the base similar to that of FIG. 3.

FIG. 7 is a top plan view of the prism illustrating the orthogonal ROLL, PITCH and YAW axes, the latter axis being vertically disposed perpendicular to the sheet and represented by a dot at the intersection of the horizontal ROLL and PITCH axes.

DETAILED DESCRIPTION OF THE INVENTION

Referring now to the drawings, and more particularly to FIG. 1, there is shown, in exploded, sectional form, the preferred embodiment of the adjustable holder of the present invention, being generally designated 10. The adjustable holder 10 includes a base 12, a cover 14, means 16 for supporting an optical element 18, such as a prism or the like, between the base 12 and cover 14, and means 20, for example, in the form of four screws 22 and inserts 24, for attaching the cover 14 to the base 12.

The exterior of the holder 10 when the cover 14 is mounted on the base 12 has a rectangular shape. The base 12 is formed by a bottom wall 26 and four side walls 28, 30, 32 and 34 (only two of which are seen in FIG. 1). The side walls 28, 30, 32 and 34 and bottom wall 26 define a cylindrical recess or cavity 36 within the base 12. The base 12 and cover 14, preferably made of aluminum, have respective central portions which define first and second spherical surfaces 38, 40 which face one another respectively from the bottom and top of the cavity 36 when the cover is mounted to the base.

The supporting means 16 includes a sphere-like element 42 which preferably is machined from a spherical steel ball. The element 42 has a pair of spaced apart spherical segments 44, 46 which are interconnected by a central membrane web 48. The spherical segments 44, 46 define at opposite ends of the element spherical surface portions 50, 52, respectively. The first and second spherical surface portions 38, 40 of the base 12 and cover 14, respectively, and the opposite end spherical surface portions 50, 52 of the sphere-like element 42 are all part of a common spherical surface. The parts of the element 42—the segments 44, 46 and web 48—are what remains of the spherical steel ball after cut-out portions are formed in the ball by the machining operations. The prism 18 is supported in the cut-out portion at both ends of the web 48 and between the portions of the spherical segments 44, 46 bounding the cut-out portion at one side of the web 48.

The supporting means 16 further includes an adjusting means in the form of a turnbuckle 54, a nut 56 and a pair of openings 58, 60 in the spherical segments 50, 52 of the sphere-like element 42. The opening 60 has a diameter sufficiently larger than the outside diameter of the turnbuckle 54 for allowing the turnbuckle to be inserted through opening 60. An upper end 62 of the turnbuckle has left hand threads for screwing into the internally threaded opening 58. The lock nut 56 has internal right hand threads which will receive the right hand threads of a lower end 64 of the turnbuckle. The upper end of the turnbuckle must be screwed almost completely through the threaded opening 58 so that the lower end of the turnbuckle can be positioned a sufficient distance above the lower spherical segment 46 to allow installing of the nut 56 on the lower end of the turnbuckle. Once the nut 56 has been installed on the lower end 64 of the turnbuckle and the upper end of the turnbuckle backed down through the upper opening 58 to the position seen in FIG. 3, the nut 56 may be turned so as to tighten down against the interior surface of the lower spherical segment 46. By so tightening the nut 56, the membrane web 48 bends and the spherical segments 44, 46 securely clamp the prism 18 therebetween and in a fixed relationship to the segments and web of the element 42. Consequently, when the angular portion of the sphere-like element 42 is adjusted with respect to the base 12, the prism 18 and element 42 move together as a unit.

When the supporting means 16 (i.e. sphere-like element 42 and turnbuckle 54) and the prism 18 clamped therein are positioned within the cavity 36 of the base 12 and the cover 14 is mounted on the base, the spherical surface portions 50, 52 on opposite ends of the element 42 engage the corresponding second and first spherical surface portions 40, 38 on the cover 14 and base 12. Through such engagement along a common spherical surface it can be readily seen that the supporting means 16 is universally moveable relative to the base and cover and consequently the angular portion of the supporting means 16 and prism 18 can be readjusted in roll, pitch and yaw simultaneously. The diagonal face 66 of the prism 18 is located at a diametral plane of the sphere-like element 42 which minimizes the translation of the point of turning (which is the intersection point of the orthogonal ROLL, PITCH and YAW axes in FIG. 7). Therefore, it can be readily appreciated that the angular position of the prism 18 and paths of light rays LR (FIG. 2) through windows 68, 70 defined in side walls 28, 30 of the base 12 may be readjusted for all angular directions at one time.

When the desired angular position is found, the cover 14 is rigidly attached to the base 12 by manipulation of attaching means 20, that is, by tightening Allen head screws 22 through holes 72 (FIG. 5) in the cover 14 and into internally threaded inserts 24 pressed fitted into recess 74 (FIG. 6) in the upper corners of the base 12. Whenever further readjustment of the position of the prism 18 needs to be made, the screws 22 are merely loosened slightly and a conventional tool (not shown) is used having a head which will fit through a central opening 76 in the cover 14 and into a hex shaped recess 78 formed in the upper spherical segment 44. Through use of the tool, the position of the supporting means 16 and prism 18 may be manually adjusted quickly through the same universal movement as described before. Then the screws 22 are retightened so as to clamp the supporting means 16 between the base 12 and cover 14.

It is thought that the adjustable holder of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An adjustable holder for an optical element, comprising:
    (a) a base having a portion defining a first spherical surface;
    (b) a cover mountable to said base and having a portion defining a second spherical surfaces spaced from, but facing, said first spherical surface when said cover is mounted to said base;
    (c) means for supporting the optical element, said supporting means capable of being disposed between said base and cover and having spherical surface portions at its opposite ends engageable with said first and second spherical surface portions of said base and cover along a common spherical surface for allowing universal movement of said supporting means relative to said base, when said supporting means is disposed between said base and cover; and
    (d) means for attaching said cover to said base so as to apply forces through said first and second spherical surface portions of said base and cover and against said opposite end spherical surface portions of said supporting means for clamping the same in a fixed angular position relative to said base, said attaching means being adjustable for varying the magnitude of said forces so applied to allow said supporting means to be universally moved relative to said base to readjust the angular position of said supporting means and optical element therewith relative to said base in roll, pitch and yaw simultaneously.

2. The adjustable holder as recited in claim 1, wherein said supporting means includes:
    a pair of spaced apart spherical segments defining said respective spherical surface portions;
    a central membrane web interconnecting said spherical segments, the optical element being supported at one side of said web between said spherical segments; and
    adjusting means disposed between said spherical segments at a side of said web opposite to its one side for causing said spherical segments to securely clamp said optical element therebetween and in fixed relationship to said segments and interconnecting web.

3. The adjustable holder as recited in claim 1, wherein said base includes a plurality of windows through which light rays may be transmitted to and from the optical element.

4. The adjustable holder as recited in claims 1 or 2, wherein said attaching means includes a plurality of fasteners for attaching said cover to said base and concurrently clamping said supporting means therebetween.

5. The adjustable holder as recited in claims 1 or 2, wherein at least one of said base and cover has an opening defined therein for providing access to said supporting means to facilitate moving the same to readjust the angular position of said supporting means and optical element relative to said base.

6. The adjustable holder as recited in claim 5, wherein said supporting means has a recess defined therein aligned with said opening in said one of said base and cover, said recess being configured to accept a tool for use in universally moving said supporting means to readjust the angular position of the same.

* * * * *

UNITED STATES PATENT AND TRADEMARK OFFICE
CERTIFICATE OF CORRECTION

PATENT NO. : 4,381,884
DATED : May 3, 1983
INVENTOR(S) : Omer Houle

It is certified that error appears in the above—identified patent and that said Letters Patent is hereby corrected as shown below:

Col. 5, line 13 (claim 1, line 6) delete "surfaces" and insert --- surface ---.

Signed and Sealed this

Second Day of August 1983

[SEAL]

Attest:

GERALD J. MOSSINGHOFF

Attesting Officer

Commissioner of Patents and Trademarks